United States Patent
Nutzel et al.

[15] 3,684,787

[45] Aug. 15, 1972

[54] PREPARATION OF POLYALKENAMERS

[72] Inventors: Karl Nutzel, Opladen; Friedrich Haas, Cologne; Gunter Marwede, Leverkusen, all of Germany

[73] Assignee: Farbenfabriken Bayer Aktiengesellschaft, Leverkusen, Germany

[22] Filed: April 6, 1970

[21] Appl. No.: 26,185

[30] Foreign Application Priority Data

April 15, 1969 Germany..........P 19 19 048.8

[52] U.S. Cl............260/93.1, 252/429 B, 260/88.2 E
[51] Int. Cl...........C08f 1/28, C08f 3/02, C08f 15/04
[58] Field of Search..........260/93.1; 252/429, 88.2 E

[56] References Cited

UNITED STATES PATENTS

| | | | |
|---|---|---|---|
| 3,441,546 | 4/1969 | Garner et al. | 260/80.7 |
| 3,045,001 | 7/1962 | Berger | 260/93.5 |
| 3,449,310 | 6/1969 | Dall'Asta | 260/93.1 |
| 3,458,489 | 7/1969 | Natta et al. | 260/93.1 |
| 3,459,725 | 8/1969 | Natta et al. | 260/93.1 |
| 3,476,728 | 11/1969 | Natta et al. | 260/93.1 |

*Primary Examiner*—Joseph L. Shoter
*Assistant Examiner*—Richard A. Gaither
*Attorney*—Connolly and Hutz

[57] ABSTRACT

Aromatic and aliphatic nitro compounds as cocatalysts to improve organometal mixed catalysts for polymerizing cycloalkenes under ring opening.

6 Claims, No Drawings

PREPARATION OF POLYALKENAMERS

It is known that cycloalkenes, particularly cyclopentene, can be polymerized with ring opening with compounds of titanium, tungsten, molybdenum, niobium and tantalum in combination with organic compounds or hydrides of metals of groups I to III of Mendelejeff's Periodic System of Elements (subsequently referred to as Periodic System) as catalysts. The yields, particularly those polymers of polycyclopentene, are, however, low so that polymerization must be carried out in the absence of solvents. In bulk polymerization high viscosity intermediate stages occur and particularly in the instant polymerization cross-linking is observed so that temperature control during polymerization and removal of the catalyst residues in subsequent processing is impossible in large scale operation. Moreover, cross-linked products are of no industrial interest.

Although the yields can be improved by adding cocatalysts such as peroxides, alcohols, mercaptans, carboxylic acids, phenols or disulphides, a technically and industrially reasonable process is not obtained even with such catalyst systems since very high catalyst amounts are required.

One object of this invention is the use of aliphatic and aromatic, particularly chlorinated aromatic nitro compounds as co-catalysts in the ring opening polymerization of cycloalkenes with organometallic mixed catalysts. The co-catalysts of this invention avoid the difficulties hitherto encountered in ring opening polymerization of cycloalkenes. Now polymerization can be started with very low catalyst amounts (0.4 mmol to 1 mmol of metal compound per 100 g of monomer); and even in a 10 percent by weight solution of cycloalkene in an inert solvent polymerization can still be carried out within relatively short times and in high yields.

Cycloalkenes in the present context are preferably those having four to 12 atoms in the ring, e.g. cyclobutene, cyclopentene, cycloheptene, cyclooctene, cyclononene, cyclodecene, cycloundecene and cyclododecene, and substituted cycloalkenes in which the substituents are not situated at the double bonds, for example 2- and 3-methylcyclopentene. Cyclopentene is preferred.

Suitable aliphatic and aromatic nitro compounds are, for example, nitroalkanes having one to 10 carbon atoms, one or two nitro groups and zero to three chlorine atoms, and nitroaryls having six to 20 carbon atoms, one to three nitro groups and zero to four chlorine atoms, such as 4-chloro-2-nitroanisole, 1,3-dinitrobenzene, 4-chloro-1-nitrotoluene, 3,5-dichloro1,2-dinitrobenzene, 2,4-dinitrophenyl hydrazine, 2,4-dinitrophenyl thiocyanate, 3,5-dinitrobenzyl chloride, 1,5-dinitronaphthalene, dinitrophenol, picryl chloride, picric acid, etc. They are generally used in quantities of 0.05 to 2 percent, based on the quantity of monomers. The optimum quantity must be determined in each case.

These co-catalysts are in principle effective with any organometallic mixed catalysts which are suitable for ring opening polymerization particularly with the following mixed catalysts:

I. a. Metal compounds of Groups IVa, Va and VIa of the Periodic Table, especially inorganic salts, e.g. halides (chlorides, bromides, and fluorides). Preferred are tungsten and tantalum salts especially halides. Examples are: $TiCl_4$, $TaCl_5$, $NbCl_5$, $WCl_6$, $WOCl_4$, $WCl_4(OR)_2$, $MoCl_5$, $W(allyl)_4$. combined with b. Compounds of metals of the Groups I to IV of the Periodic System having the formula:

$$R^1_x R^2_y R^3_z Me$$

in which $R^1$ represents a $C_{1-24}$ hydrocarbon preferably alkyl or aryl (phenyl, naphtyl) radical, $R^2$ represents a halogen atom, preferably chlorine and bromine, $R^3$ represents a hydrogen atom, and Me is a metal of Groups I – IV of the Periodic System, such as sodium, patassium, magnesium, calcium, aluminum, zinc, tin.

$x$, $y$, and $z$ are whole numbers so that $x+y+z=n$, $x \leq n$, $n$ = maximum valency of metal Me. Examples of such compounds are $Na(R^4)$, $R^4$ = phenyl, naphthyl, $MgR^5R^6$, $R^5$ = ethyl, phenyl, $R^6$ = Cl, Br, $AlR^7R^8R^9$, $R^7$, $R^8$, $R^9$=alkyl $C_1-C_{12}$ e.g. ethyl, isobutyl, hexyl, $R^8$, $R^9$=Cl, Br, $SnR^{10}$, $R^{11}$, $R^{12}$, $R^{13}$, $R^{10}$, $R^{11}$, $R^{12}$, $R^{13}$=alkyl $C_1-C_{12}$, e.g., ethyl isobutyl, hexyl, phenyl, $R^{13}$=H, Cl. Especially suitable combinations are $WCl_6/Al(iC_4H_9)_3$      $WOCl_4/AlCl(C_2H_5)_2$,
$NbCl_5/AlCl(CH_5)_2$,      $TaCl_5/MgC_6H_5Cl$,
$WCl_6/AlH(iC_4H_9)_2$, $TiCl_4/NaC_6H_5$, $WCl_6/SnH(C_2H_5)_3$.

II. a. an organic compound including a complex compound of metals of groups IVa to VIIa of the Periodic System which may contain halogen or hydrogen in addition to the organic radicals; and b. a compound which acts as a Friedel-Crafts catalyst; for example $Ti(C_5H_5)_2/WCl_6$, $W(allyl)_4/BF_3$, $Li_3(W(C_6H_5)_6)/POCl_3$, $W(allyl)_4/WCl_4$, $Li_3(Cr(C_6H_5)_6)/MoCl_3$, $Mn(C_4H_9)_2/WCl_6$, $Na_3(W(C_6H_5)_6/AlCl_3$, $Mn(C_4H_9)_2/TaCl_5$.

The catalyst combinations may be used in quantities e.g. of 0.1 to 5 percent by weight, based on the quantity of monomers. The quantitative proportions of the individual components may vary within wide limits, e.g. from a : b = 0.1 : 5 to 5 : 0.1 by weight. The optimum proportion must be determined for each combination.

The process is preferably carried out in the presence of inert solvents such as aliphatic, "cycloaliphatic" and aromatic hydrocarbons. Aromatic solvents are preferred. Petroleum hydrocarbon fractions, cyclohexane and, in particular, toluene are examples of suitable solvents. The concentration of the cycloalkenes in these solvents should be between 5 and 25 percent by weight, preferably between 10 and 15 percent by weight. Homopolymers of the cycloalkenes may be prepared according to the invention but the cycloalkenes mentioned may also be copolymerized. Furthermore, up to 30 percent by weight of a bicyclic or polycyclic olefine, preferably 0.05 to 5 percent by weight thereof, may be incorporated by polymerization as co-monomers. Dicyclopentadiene, norbornene and norbornadiene are examples of such bicyclic and polycyclic olefines. The polymerization is generally carried out by first introducing the anhydrous, pure cycloalkene in anhydrous and pure solvent into the reaction

| Example | Co-catalyst | Mmol of co-catalyst/100 g. of monomer | Molar ratio $WCl_6$:co-catalyst | Molar ratio $WCl_6$:Al-triisobutyl | Yield, percent | Trans-value, percent |
|---|---|---|---|---|---|---|
| 2 | Amyl nitrite | 0.32 | 1:0.5 | 1:1.33 | 34.0 | 93.0 |
| 3 | 3-chloro-1-nitrobenzene | 0.32 | 1:0.5 | 1:1.33 | 31.8 | 88.7 |
| 4 | 4-chloro-2-nitroanisole | 0.32 | 1:0.5 | 1:1.33 | 29.5 | 87.6 |
| 5 | Chloromethyl-(4-chloro-3-nitrophenyl)-sulphone | 0.32 | 1:0.5 | 1:1.33 | 33.0 | 87.9 |
| 6 | 1,3-dinitrobenzene | 0.16 | 1:0.25 | 1:1.33 | 34.1 | 91.5 |
| 7 | 2,4-dinitroanisole | 0.16 | 1:0.25 | 1:1.33 | 36.5 | 87.1 |
| 8 | 4-nitroanisole | 0.42 | 1:0.66 | 1:1.33 | 38.6 | 87.9 |
| 9 | 2,4-dinitrophenyl thiocyanate | 0.66 | 1:0.25 | 1:1.33 | 42.0 | 91.5 |
| 10 | 3,5-dinitrobenzoyl chloride | 0.13 | 1:0.20 | 1:1.33 | 46.0 | 90.3 |
| 11 | 1,5-dinitronaphthalene | 0.16 | 1:0.25 | 1:1.33 | 40.0 | 92.9 |
| 12 | 3,5-dinitrosalicylic acid | 0.09 | 1:0.14 | 1:1.33 | 32.1 | 93.0 |
| 13 | 2,4,6-trinitrobenzoic acid | 0.08 | 1:0.13 | 1:1.33 | 25.0 | 93.2 |
| 14 | dinitrophenol | 0.13 | 1:0.20 | 1:1.33 | 45.5 | 89.0 |
| 15 | 2,4-dinitrophenyl hydrazine | 0.16 | 1:0.25 | 1:1.33 | 55.0 | 90.3 |
| 16 | 2,4,6-trinitrochlorobenzene | 0.13 | 1:0.17 | 1:1.5 | 76.0 | 91.6 |
| 17 | 1,2-dinitro-3,5-dichlorobenzene | 0.80 | 1:0.16 | *1:0.3 | 76.0 | 92.8 |
| 18 | 1,2-dinitro-3,5-dichlorobenzene | 0.80 | 1:0.16 | **1:4 | 58.0 | 92.7 |
| 19 | 1,2-dinitro-3,5-dichlorobenzene | ***4.0 | 1:0.20 | ****1:2 | 54.0 | 85.0 |
| 20 | 4,4-dichloro-2-nitrodiphenyl ether | 0.32 | 1:0.5 | 1:1.33 | 41.0 | 86.8 |
| 21 | 4-chloro-1-nitrotoluene | 0.32 | 1:0.5 | 1:1.5 | 44.3 | 93.4 |
| 22 | trinitrotoluene | 0.107 | 1:0.17 | 1:1.33 | 44.3 | 89.4 |
| 23 | 2-chloro-1-nitrobenzene | 0.22 | 1:0.35 | 1:1.5 | 45.5 | 92.5 |
| 24 | 2-chloro-1-nitrobenzene | 0.22 | 1:0.35 | 1:1.33 | 43.0 | 91.6 |
| 25 | 2-chloro-1-nitrobenzene | 0.32 | 1:0.5 | 1:1.33 | 35.0 | 88.8 |
| 26 | nitrobenzene | 0.32 | 1:0.5 | 1:1.33 | 47.6 | 88.0 |
| 27 | 4-chloro-1-nitrobenzene | 0.22 | 1:0.35 | 1:1.33 | 47.6 | 93.4 |
| 28 | 4-chloro-1-nitrobenzene | 0.22 | 1:0.35 | 1:1.5 | 43.0 | 90.9 |
| 29 | 4,6-dichloro-1,3-dinitrobenzene | 0.16 | 1:0.25 | 1:1.33 | 50.0 | 89.6 |
| 30 | 4-chloro-1,3-dinitrobenzene | 0.16 | 1:0.25 | 1:1.33 | 51.2 | 89.3 |
| 31 | 4-chloro-1,2-dinitrobenzene | 0.16 | 1:0.25 | 1:1.33 | 56.7 | 91.7 |
| 32 | 3,5-dichloro-1,2-dinitrobenzene | 0.16 | 1:0.25 | 1:1.33 | 78.5 | 93.4 |
| 33 | 3,5-dichloro-1,2-dinitrobenzene | 0.16 | 1:0.25 | 1:1.33 | 79.5 | 93.3 |

*Instead of aluminum alkyl, tin triethylhydride.
**Instead of aluminum alkyl, tungsten tetraalkyl.
***Instead of $WCl_6$, $TaCl_5$ is used.
****Instead of $Al(isobutyl)_3$, $AlH(isobutyl)_3$ is used.

vessel, adding the nitro compound and then introducing measured amounts of the other components. The process is preferably carried out under a protective atmosphere of pure nitrogen or an inert gas such as argon in order to exclude unwanted moisture and oxygen. An excess pressure of protective gas is not harmful and a slight excess pressure (0.1 to 0.5 excess atmosphere) is advantageous. The temperature is adjusted to between −15°C and +15°C.

After the end of polymerization, the catalyst is deactivated with about 5 percent (based on the monomer used) of a proton active compound such as formic acid or methanol. It is advisable to add a complex forming compound at the same time which prevents the metals from remaining in the polymer after the polymer has been worked up. Hydroxy carboxylic acids such as tartaric acid, diamines such as ethylene diamine and aminoalcohols such as aminoethanol are suitable for this purpose.

The polymers can be isolated by pouring the solution into 3 to 5 times its quantity of the solution of a lower alcohol in which the age resister such as ditertiary butyl cresol, β-phenylnaphthylamine or the like is dissolved before precipitation. Alternatively, the solution may be introduced into boiling water and the solvent removed with steam. In this case, the age resister must be added to the polymer solution together with the polymerization inhibitor. The polymers containing residues of water or alcohol may be freed from these in a circulating air oven, a flat band drier or a drying screw.

The polymerization and working up processes may, of course, also be carried out continuously.

The polymers obtained have a rubber-like character and are arranged mainly head to tail. Polymers containing more than 90 percent of trans-bonds, more than 80 percent of cis-bonds and mixed cis/trans bonds can be prepared. The preparation of polypentenamer having more than 93 percent of trans-bonds is particularly preferred.

In the following Examples, only dry apparatuses and pure, dry reagents are used. A protective gas atmosphere of pure nitrogen is used.

EXAMPLE 1

130 Parts of pure anhydrous toluene and 44 parts of pure anhydrous cyclopentene are introduced with exclusion of air into a 3-necked flask equipped with gas-tight stirrer, thermometer and device for introducing pure nitrogen above the reagents. 0.63 mmol of $WCl_6$ are then added with stirring. The reaction mixture is then cooled to −5°C and 0.85 mmol of aluminum triisobutyl is added. The temperature is maintained at 0°C by external cooling. Polyperization is stopped after 2 hours by the addition of 5 parts of ethanolamine dissolved in 10 parts of methanol and the polymer is isolated by precipitation in 5 times its quantity of ethanol. The product is dried at 80°C in a vacuum drying cupboard (approximately 50 mm Hg). The yield is 8.9 percent of the theoretical.

EXAMPLES 2 to 33

The following Examples, the results of which are tabulated, are polymerized and worked up according to the method described in Example 1. Unless otherwise indicated, the co-catalyst is added before or simultaneously with $WCl_6$.

We claim:
1. In a process for homopolymerizing and copolymerizing cycloalkenes with ring opening in an inert organic solvent and in the presence of an organometal mixed catalyst, the improvement comprising adding about 0.02 to 2 percent by weight based on monomers of an aliphatic or aromatic nitro compound, the cycloalkene being either cyclobutene, cyclopentene, cycloheptene, cyclooctene, cyclononene, cyclodecene, cycloundecane or cyclododecene and the organometal mixed catalyst comprising (a) a metal compound of Groups IVa, Va and VIa and (b) a com- pound of Groups I-IV of the Periodic System, (a) and (b) being in a weight ratio of 0.1:5 to 5:0.1.

2. Process according to claim 1 wherein the cycloalkene is cyclopentene.

3. Process according to claim 2 wherein said inert organic solvent is an aromatic hydrocarbon.

4. Process according to claim 2 wherein said nitro compound is a nitroalkene having one to 10 carbon atoms, one or two nitrogroups and zero to three chlorine atoms.

5. Process according to claim 2 wherein said nitro compound is a nitroaryl having six to 20 carbon atoms, one to three nitrogroups and zero to four chlorine atoms.

6. A catalyst composition comprising (I) an organometal mixed catalyst of (a) a tungsten compound and (b) a compound of the formula $$R^1_x R^2_y R^3_z Me$$

wherein $R^1$ is a $C_1-C_{24}$ hydrocarbon, $R^2$ is chlorine or bromine, $R^3$ is hydrogen, Me is aluminum or tin, $x$, $y$ and $z$ are whole numbers whose sum is equal to the maximum valency of Me and $x$ is less than said maximum valency, (a) and (b) being in a weight ratio of 0.1:5 to 5:0.1 and (II) an aliphatic or aromatic nitro compound.

* * * * *